Jan. 17, 1961  H. MELLE  2,968,227
PHOTOELECTRIC EXPOSURE METER
Filed March 6, 1956  4 Sheets-Sheet 1
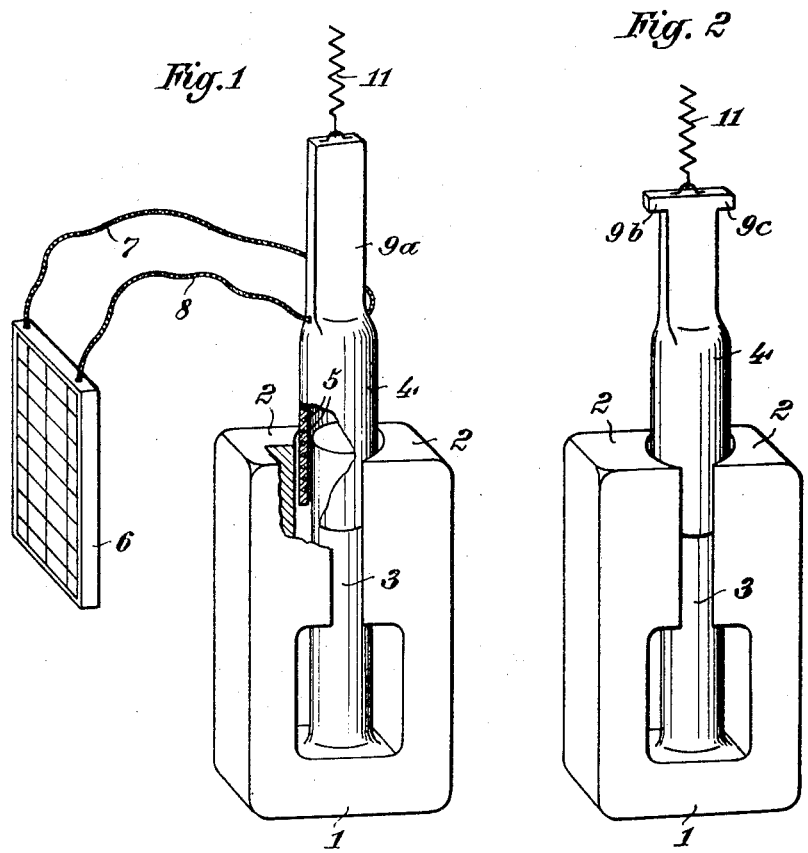
Inventor
HEINZ MELLE
By Mock & Blum
ATTORNEYS

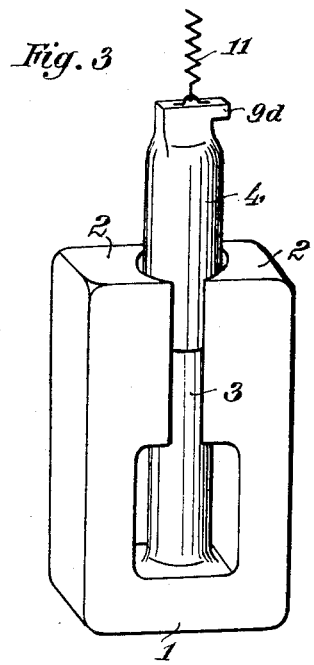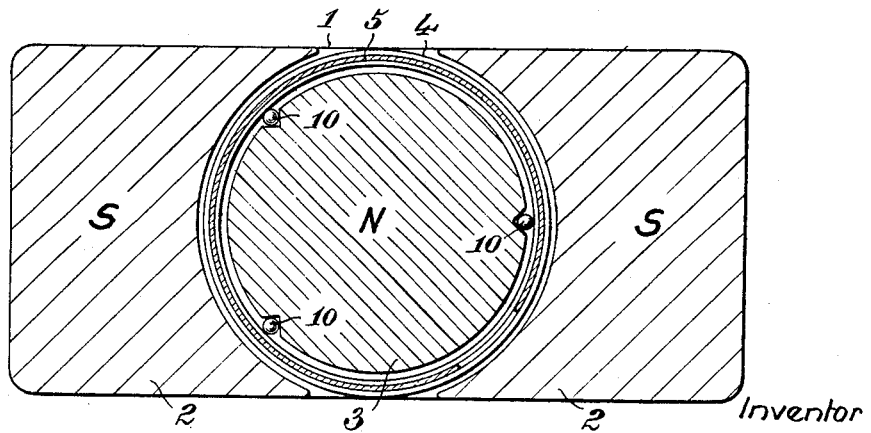

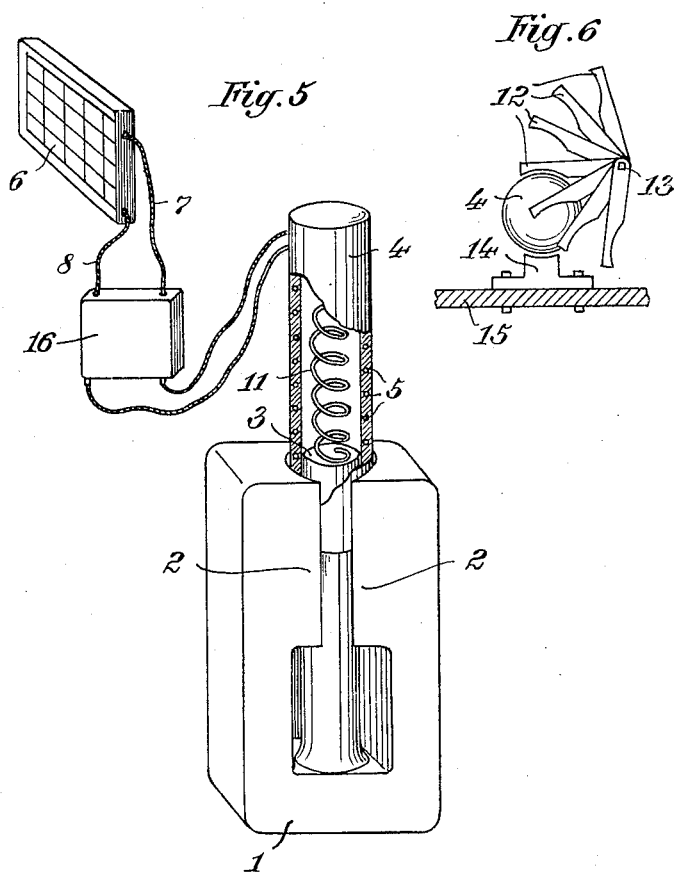

Jan. 17, 1961   H. MELLE   2,968,227
PHOTOELECTRIC EXPOSURE METER

Filed March 6, 1956   4 Sheets-Sheet 4

Inventor
HEINZ MELLE
BY Mock & Blum
ATTORNEYS

United States Patent Office 2,968,227
Patented Jan. 17, 1961

2,968,227

PHOTOELECTRIC EXPOSURE METER

Heinz Melle, Braunschweig, Germany, assignor to Voigtlander A.G., Braunschweig, Germany, a corporation of Germany Filed Mar. 6, 1956, Ser. No. 569,880

Claims priority, application Germany Mar. 9, 1955

14 Claims. (Cl. 95—10)

This invention relates to photoelectric exposure meters and it has particular relation to such meters used in the control of automatic adjustment of exposure conditions in photographic cameras.

Conventional photoelectric exposure meters, whether of the independently housed type or built-in in a camera, are characterized by having highly sensitive moving coil systems, and are quite satisfactory insofar as obtaining readings for providing a correct exposure of the negative material of the camera is concerned.

However, when such exposure meters are used as means for effecting automatic adjustment of exposure systems of a camera, with an indicating element of the exposure meter being the element which is abutted by scanning elements or the like, numerous difficulties are encountered. Due to the high sensitivity of the moving coil system of the exposure meters, the parts moved thereby, such as an indicating needle, are relatively fragile and sensitive. Consequently, means must be provided, when using this needle or an equivalent element as a stop for scanning means for automatic adjustment of exposure conditions, to brace or clamp the needle against movement or deflection in its indicating position. In so doing, care must be exercised to avoid any damage to the very sensitive measuring mechanisms. Furthermore, conversion of the circular or rotary movement of the pointer of a moving coil instrument into a straight line control movement is rather difficult due to the non-linear response of such a rotating indicator to linear changes in light values.

There are also known electrical measuring instruments which use, in place of a rotating coil, telescoping coils associated with a magnetic system. However, these are characterized by relatively great length of the elongated coil element, the necessity for precise guiding thereof, which is difficult to effect, the heaviness and bulkiness of the structure, the difficulties in providing a stable housing or casing for the instrument, the complications of their parts, and the ease with which such instruments can become maladjusted. The great length is due, in part, to the fact that the telescoping coil has a length substantially equal to that of the rod magnet with which it is associated, and the iron cylinders surrounding the magnet and the coils contributes to the heaviness and bulkiness of the mechanism. Consequently, instruments of this type are not well adapted for use in photoelectric exposure meters, particularly in such meters as used in cameras to control the automatic adjustment of exposure conditions.

In accordance with the present invention, the foregoing difficulties are avoided and an improved photoelectric exposure meter, useful to pre-set the automatic adjustment of exposure conditions of a camera, are provided in a novel manner. More specifically, a generally U-shape magnet is provided having poles, of the same polarity, at the outer ends of the legs of the U, these poles having facing pole pieces of arcuate form defining part of the periphery of a cylinder. A pole of the opposite polarity, preferably cylindrical in cross section, extends upwardly between these facing pole faces and has its surface concentric therewith but of substantially less radius. A generally cylindrical movable coil member is telescoped over this central pole so that it is disposed between the central pole and the facing arcuate pole faces. This moving coil member is preferably of a suitable plastic composition or other dielectric material and has the coil winding embedded therein.

The movable coil carrying member is supported on the central pole, and may have direct sliding engagement therewith or there may be suitable antifriction means, such as ball bearings, disposed between the central pole and the movable coil member. Thus, the necessity for external support of the movable member is eliminated.

The magnetic structure including the similar polarity poles at the outer ends of the legs of the U, and the central pole extending between the arcuate pole faces, may be either a permanent magnet or it may be an electromagnet. Electromagnets may be used, for example, in instances where the camera is a movie camera or a television camera, whereas permanent magnets are preferred in hand cameras.

The outer end of the movable coil member projects a substantial distance from the outer end of the central pole member, and is suitably constructed and arranged for engagement by scanning elements associated with the automatic exposure condition setting mechanism of the camera to limit the automatic adjustment in accordance with measured light values. The outer end of this movable member may be suitably shaped for engagement by said scanning elements and preferably has a support element closely adjacent thereto at the zone where it is engaged by the scanning elements to prevent undue deflection of the movable element. The movable coil element is moved in one direction by the interaction between the field developed by its winding and the field of the magnet, and is biased in the other direction by suitable means, such as a coil or compression spring. Further to prevent undue deflection of the movable member when engaged by the scanning elements, the latter may be arranged in pairs movable in concordance with each other and tending to deflect the movable member in opposite directions, whereby to effectively counterbalance any deflecting force.

The appended drawings diagrammatically illustrate some embodiments of and a best way for carrying out the invention.

In the drawings:

Fig. 1 is a perspective diagrammatic view of a measuring mechanism according to the present invention.

Figs. 2 and 3 illustrate the measuring mechanism with modifications of the telescoping coil body which serves simultaneously as a stop member.

Fig. 4 is a cross-section through the measuring mechanism.

Fig. 5 is a diagrammatic perspective view of a modified measuring mechanism, partly in section.

Fig. 6 is a top view of scanning members which are fastened to a common shaft of rotation and act on the coil carrier.

Equal or corresponding parts are denoted in all figures by identical reference numerals.

Figure 7:
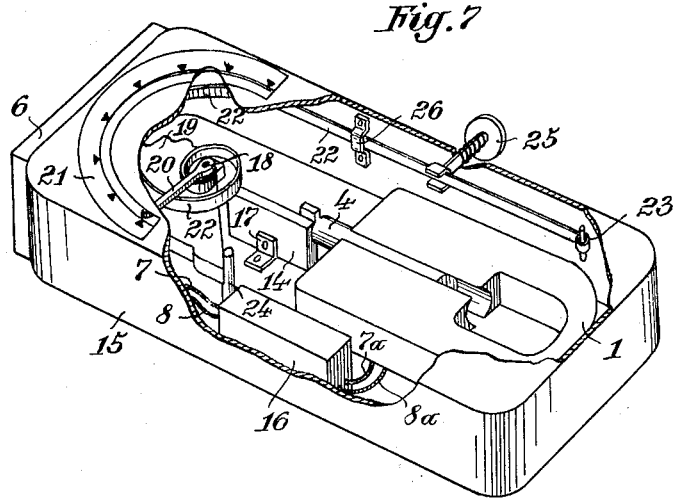
Fig. 7 illustrates a hand exposure meter in broken up view.

Referring now to the drawings in detail, the generally U-shaped magnet 1 has an outer pole 2, which is shown in the drawing as a split pole, and a cylindrical inner pole 3. In the cylindrical magnetic gap between poles 2 and 3 the tubular coil body 4 can move. The coil 5, to which the photoelectric current is conducted from photocell 6 through the wires 7 and 8, is molded into the coil body 4. The coil body 4 is provided with stop members 9a to 9d, against which the scanning members (not shown in the drawing), which limit the adjusting paths of the exposure organs, can run. In Fig. 1 the stop member is shown as a simple ledge 9a; in Fig. 2 it is shown as a ledge provided with two oppositely arranged stop noses 9b and 9c; in Fig. 3 it is shown as a simple stop nose 9d. Between the magnet pole 3 and the coil body 4, three rows of balls 10, which extend perpendicularly to the plane of the drawing, are provided (see Fig. 4). They guide the coil body in the magnet gap and facilitate its displacement. Against the magnetic pull on the coil body 4, a spring 11 acts, the force of which is determined in such a manner that accurately reproducible adjusting paths of the coil carrier result, in dependence on the photoelectric current.

In Fig. 5 the magnet 1 is provided with an outer pole 2 which is shown as a split pole, and it has a cylindrical inner pole 3. The tubular coil body 4 can move in the cylindrical gap between the poles 2 and 3. The coil 5 is molded into the coil body 4. The current produced by the photoelectric cell 6 upon incidence of light thereon is conducted by the wires 7 and 8 to the transistor-amplifier 16, and is then supplied in amplified condition to the coil 5, whereby the coil body 4 is displaced in the direction of its longitudinal axis in dependence on the photoelectric current. In the hollow space of coil body 4 a spring 11 is located, the tension of which is adjusted to the pulling force of the magnet. Spring 11 is secured at one end to the front surface of pole 3 and, on the other end, to the cap of coil body 4. The force of spring 11 acts as a retractive force against the magnetic pull.

Fig. 6 illustrates the manner in which displacement of the coil body 4 (which takes place in dependence on the photoelectric current in each case) can be scanned automatically in a simple manner. In the measuring procedure, the scanning members 12, which are radially and axially staggered relative to each other, are turned about the axis of the common shaft 13 counterclockwise. The rotation can take place, for example, by spring effect, and it is continued until the circular recess in the edge of one of the arms 12 strikes the coil body 4. Thus, at each adjusted position of the coil body 4, a certain angle of rotation of shaft 13 is possible. If the shaft 13 is in connection with the adjustment means, for example, of the shutter time or diaphragm, then one of these exposure factors is thus adjusted in conformity with the current supplied by photoelectric cell 6. Immediately below the abutment zone of the coil body 4 for the scanning members 12, a supporting body 14, fastened to the camera wall 15, is located. Its supporting surface, which is fitted to the periphery of coil body 4, is very close to said body so that even the smallest deflection of coil body 4, resulting from the abutment of scanning members, causes the coil body 4 to lie against the supporting body 14 so that damage to the telescoping coil system is safely avoided.

Fig. 7 illustrates a hand exposure meter embodying the present invention. The photoelectric cell 6 is arranged on a narrow side of the casing 15. The current produced by cell 6 is supplied through wires 7 and 8 to the transistor-amplifier 16, is amplified there and the amplified current is supplied through wires 7a and 8a on the adjusting body 4 of the instrument 1. The adjusting body 4 moves alongside a supporting body 14, which is fastened to the bottom of the casing by means of an angle member 17. A stepped disc 19, which is rotatable about shaft 18, serves as a scanning member. A pointer 20 is rotatable together with disc 19 and the position of the pointer can be read on a scale 21. Movement of the scanning disc 19 is effected by a spiral spring 22. This spring is fastened at one of its ends to scanning body 19 and at its other end to a pin 23, which is stationary in the casing. Spring 22 acts in such a manner that in rest position it keeps the scanning member in its zero position, which may be determined, for example, by a stop pin 24. If an exposure measurement is supposed to be carried out, it is only necessary to press operating button 25, the inner end of which grips spring 22 in a fork-like manner. By pressing button 25 inward, spring 22 will be rounded out between its fastening point 23 and a stationary flap 26, whereby disc 19 is turned until it reaches adjusting member 4 of the telescoping coil system. The stop position can be read, in each case, by pointer 20 and scale 21; for example, as a light value.

The arrangement described above for a hand exposure meter can be used also for automatic adjustments of exposure. For this purpose, it would be only necessary to provide, instead of the pointer 20 caused to move the spring 22, a member acting on the exposure adjustment of the camera.

The structure according to the present invention can be made in a very compact manner, so that it can be built in even in small hand cameras without trouble. Furthermore, even at very small dimensions of the structure, its construction can be rendered, without the use of relatively expensive auxiliary means, sufficiently sturdy, so that safe operation is secured.

It will be understood that this invention is not limited to the specific constructions, designs, arrangements and other details described above and illustrated in the drawings and can be carried out with various modifications without departing from the scope of the invention as defined in the appended claims.

What is claimed is:

1. In a photoelectric exposure meter: a relatively elongated generally U-shape magnetic structure having poles of like polarity at the outer ends of the legs of the U and formed with facing pole faces defining part of the periphery of a tubular passage extending substantially parallel to said legs, and a relatively elongated central pole extending from the bight of the U between said pole faces and having its surface in uniformly spaced relation to said pole faces to define therewith a relatively narrow annular passage of substantially uniform width, at least that portion of the central pole longitudinally coextensive with said pole faces having a polarity opposite to that of the latter; a relatively elongated tubular coil carrier of non-magnetic material embracing said central pole and movable longitudinally thereof between said pole faces, said carrier having bearing engagement on said central pole and said central pole constituting the sole support for said carrier; said carrier having its outer portion projecting substantially beyond said central pole in said pole faces; a coil winding on said carrier; a photo cell having its output connected to said coil winding for energization of the latter for magnetic interaction with the magnetic field between said poles to displace said carrier in one direction along said central pole in accordance with the value of the photo cell output current; means biasing said carrier in the opposite direction along said central pole; whereby the position of the outer end of said carrier relative to said magnetic structure indicates the value of the light incident on said photo cell; automatic exposure condition adjusting means for a camera; and scanning elements included in said exposure condition adjusting means and movably mounted adjacent said carrier; said scanning elements being selectively engageable with the outer portion of said carrier to control said exposure condition adjusting means in accordance with the value of the instant light on said photocell.

2. In a photoelectric exposure meter as claimed in claim 1: said magnetic structure comprising a permanent magnet.

3. In a photoelectric exposure meter as claimed in claim 1: said pole faces being arcuate and concentric and defining a cylindrical passage, said central pole having a circular cross section concentric with said pole faces; and said coil carrier being a hollow cylinder concentric with said central pole.

4. In a photoelectric exposure meter as claimed in claim 1: said carrier having a closed outer end.

5. In a photoelectric exposure meter as claimed in claim 1: said coil winding being embedded within the wall of said carrier.

6. In a photoelectric exposure meter as claimed in claim 1: antifriction bearing means disposed between the inner surface of said carrier and the outer surface of said central pole.

7. In a photoelectric exposure meter as claimed in claim 6: said antifriction bearing means comprising ball bearings.

8. In a photoelectric exposure meter as claimed in claim 1: a supporting body extending along the path of movement of said carrier and arranged closely adjacent thereto; said supporting body being engageable by said carrier to resist undue deflection thereof when contacted by said scanning elements.

9. In a photoelectric exposure meter as claimed in claim 1: said biasing means comprising a spring connected between said central pole and the outer end of said carrier.

10. In a photoelectric exposure meter as claimed in claim 9: said carrier having a closed outer end and said spring being connected between said closed outer end and said central pole.

11. In a photoelectric exposure meter as claimed in claim 1: an amplifier connected between said photoelectric cell and said coil winding.

12. In a photoelectric exposure meter as claimed in claim 11: said amplifier comprising a transistor amplifier.

13. In a photoelectric exposure meter as claimed in claim 1: said scanning elements being mounted on a common shaft rotatable adjacent the path of movement of said carrier; said scanning elements being progressively staggered circumferentially and axially of said shaft.

14. In a photoelectric exposure meter as claimed in claim 13: said scanning members having at least portions thereof extending radially from the axis of said common shaft.

References Cited in the file of this patent

UNITED STATES PATENTS

| | | |
|---|---|---|
| 730,262 | Hartmann | June 9, 1903 |
| 1,928,951 | Pendock | Oct. 3, 1933 |
| 1,934,484 | Camilli | Nov. 7, 1933 |
| 2,058,531 | Tuttle | Oct. 27, 1936 |
| 2,061,909 | Karg | Nov. 24, 1936 |
| 2,080,274 | Huenger | May 11, 1937 |
| 2,191,414 | Sauer | Feb. 20, 1940 |
| 2,253,055 | Tuttle et al. | Aug. 19, 1941 |
| 2,325,463 | Axler | July 27, 1943 |
| 2,360,256 | Mihalyi | Oct. 10, 1944 |
| 2,412,424 | Rath | Dec. 10, 1946 |
| 2,518,717 | Rath | Aug. 15, 1950 |
| 2,745,021 | Kurshan | May 8, 1956 |
| 2,768,350 | Spaulding | Oct. 23, 1956 |

FOREIGN PATENTS

| | | |
|---|---|---|
| 802,940 | France | June 22, 1936 |